US012386499B2

(12) United States Patent
Tsai et al.

(10) Patent No.: US 12,386,499 B2
(45) Date of Patent: Aug. 12, 2025

(54) ELECTRONIC DEVICE, METHOD, AND COMPUTER-READABLE RECORDING MEDIUM FOR DEACTIVATING CHAT ROOM OF MESSENGER APPLICATION

(71) Applicants: LY Corporation, Tokyo (JP); LINE Plus Corporation, Seongnam-si (KR)

(72) Inventors: Ching-hsiang Tsai, Tokyo (JP); Chien-ju Lin, Tokyo (JP); Man-chen Wu, Tokyo (JP); Kuan-wei Lin, Tokyo (JP)

(73) Assignee: LY Corporation, Tokyo (JP)

( * ) Notice: Subject to any disclaimer, the term of this patent is extended or adjusted under 35 U.S.C. 154(b) by 0 days.

(21) Appl. No.: 17/863,901

(22) Filed: Jul. 13, 2022

(65) Prior Publication Data

US 2022/0350476 A1 Nov. 3, 2022

Related U.S. Application Data

(63) Continuation of application No. PCT/KR2021/000468, filed on Jan. 13, 2021.

(30) Foreign Application Priority Data

Jan. 14, 2020 (CN) .......................... 202010038882.6

(51) Int. Cl.
 *G06F 3/04847* (2022.01)
 *G06F 3/0488* (2022.01)
 *H04L 51/216* (2022.01)

(52) U.S. Cl.
 CPC ........ *G06F 3/0488* (2013.01); *G06F 3/04847* (2013.01); *H04L 51/216* (2022.05)

(58) Field of Classification Search
 CPC .. G06F 3/04847; G06F 3/0488; G06F 3/0482; G06F 3/04842; H04L 51/216;
 (Continued)

(56) References Cited

U.S. PATENT DOCUMENTS

2013/0332721 A1* 12/2013 Chaudhri .............. G06F 3/0481
 713/100
2015/0006638 A1* 1/2015 Jain ...................... H04L 51/043
 709/204

(Continued)

FOREIGN PATENT DOCUMENTS

KR 10-2016-0083820 A 7/2016
KR 10-1656956 B1 9/2016
(Continued)

OTHER PUBLICATIONS

International Search Report for PCT/KR2021/000468 dated Apr. 27, 2021 (PCT/ISA/210).

(Continued)

*Primary Examiner* — John T Repsher, III
(74) *Attorney, Agent, or Firm* — Sughrue Mion, PLLC

(57) ABSTRACT

An electronic device, a method, and a computer-readable recording medium are provided for deactivating a chat room of a messenger application. The electronic device is configured for: receiving a deactivation request for one or more chat rooms, in which the deactivation request is associated with a chat room configuration, and the chat room configuration includes a deactivation condition for the one or more chat rooms; storing the chat room configuration including the deactivation condition for the one or more chat rooms based on the deactivation request; and deactivating the one or more chat rooms based on determining whether or not the deactivation condition for the one or more chat rooms is satisfied.

18 Claims, 21 Drawing Sheets

(58) Field of Classification Search
CPC ....... H04L 51/04; H04L 51/212; H04L 51/18;
H04L 51/21; H04M 1/72436; G06Q
50/30; G06Q 50/01; H04W 4/029
See application file for complete search history.

(56) References Cited

U.S. PATENT DOCUMENTS

| | | | | |
|---|---|---|---|---|
| 2015/0149567 | A1* | 5/2015 | Shmilov | H04L 67/54 |
| | | | | 709/206 |
| 2016/0197866 | A1* | 7/2016 | Cha | H04L 51/212 |
| | | | | 709/205 |
| 2017/0346914 | A1* | 11/2017 | Cheung | G06Q 10/1093 |
| 2018/0006975 | A1* | 1/2018 | Tian | H04L 51/52 |
| 2018/0332178 | A1 | 11/2018 | Ni et al. | |
| 2019/0230482 | A1* | 7/2019 | Chavez | H04W 4/12 |
| 2020/0356687 | A1* | 11/2020 | Salzman | H04L 63/108 |
| 2020/0403951 | A1* | 12/2020 | Kapoor | H04L 51/216 |

FOREIGN PATENT DOCUMENTS

| | | |
|---|---|---|
| KR | 10-2018-0067589 A | 6/2018 |
| KR | 10-2018-0129073 A | 12/2018 |

OTHER PUBLICATIONS

Korean Office Action dated Feb. 11, 2024, in Korean Patent Application No. 10-2022-7023686.
Chinese Office Action dated Jul. 5, 2024 in Application No. 202010038882.6.
Chinese Office Action dated Sep. 14, 2024 in Application No. 202010038882.6.
Korean Office Action dated Sep. 26, 2024 in Application No. 10-2022-7023686.

* cited by examiner

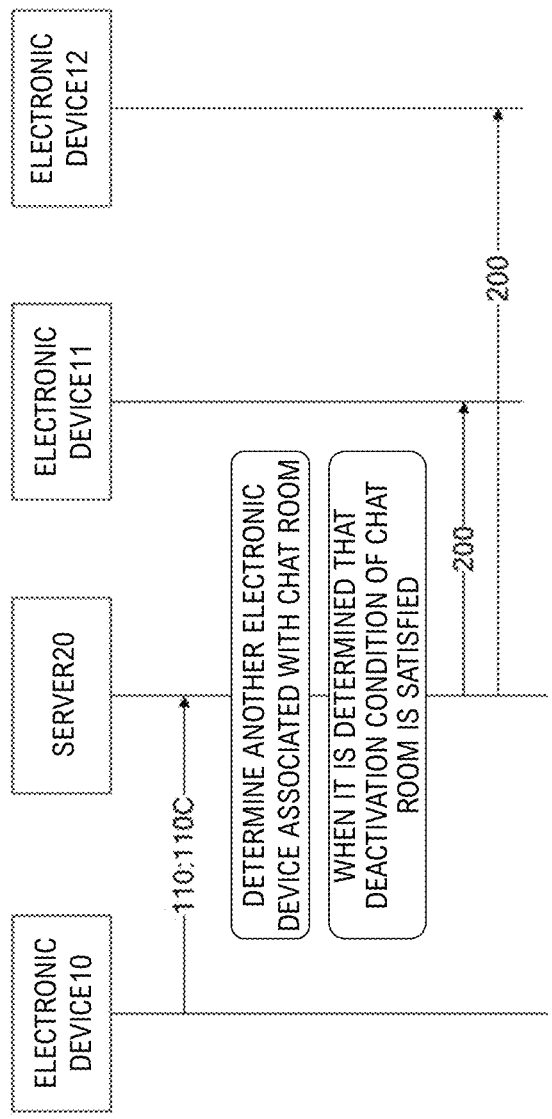

ELECTRONIC DEVICE, METHOD, AND COMPUTER-READABLE RECORDING MEDIUM FOR DEACTIVATING CHAT ROOM OF MESSENGER APPLICATION

CROSS-REFERENCE TO RELATED APPLICATIONS

This application is a continuation of International Application No. PCT/KR2021/000468 filed on Jan. 13, 2021, which claims priority to Chinese Patent Application No. 202010038882.6 filed on Jan. 14, 2020, the entire contents of which are herein incorporated by reference.

TECHNICAL FIELD

Apparatuses and methods consistent with example embodiments relate to deactivating a chat room of a messenger application, and specifically, to deactivating a chat room of a messenger application based on a deactivation condition.

BACKGROUND

A messenger application may be installed on an electronic device to exchange messages with other users. When the user executes the messenger application using the electronic device, the user may generate a chatting interface shared with other users through the messenger application and exchange messages in the chatting interface. The chatting interface has an easy-to-set function.

In the existing messenger applications, when a user wants to set a function for the chatting interface, the user has to repeatedly input manual operations for different situations, and there is also not enough flexibility of using functions and parameters configurable in the chatting interface.

SUMMARY

One or more example embodiments provide an electronic device, a method, and a computer-readable recording medium for deactivating a chat room of a messenger application based on a deactivation condition.

According to an embodiment of the disclosure, a method for deactivating a chat room of a messenger application by an electronic device, may include: receiving a deactivation request for one or more chat rooms, in association with a chat room configuration that includes a deactivation condition for the one or more chat rooms; storing the chat room configuration including the deactivation condition for the one or more chat rooms based on the deactivation request; and deactivating the one or more chat rooms based on determining whether or not the deactivation condition for the one or more chat rooms is satisfied.

The method may further include: receiving an activation request for at least one of the deactivated one or more chat rooms; and activating the at least one of the deactivated one or more chat rooms based on the activation request.

The method may further include: displaying a user interface for setting the deactivation condition included in the chat room configuration; and receiving a user input for setting the deactivation condition through the user interface.

The method may further include: displaying a user interface for setting the deactivation condition included in the chat room configuration; receiving, via the user interface, a user input associated with an activation condition for the one or more chat rooms; and determining the deactivation condition based on the activation condition.

The deactivation condition may include a time condition, and the deactivating the one or more chat rooms includes deactivating the one or more chat rooms based on determining whether or not a current time satisfies the time condition.

The deactivation condition may include a position condition, and the deactivating the one or more chat rooms may include deactivating the one or more chat rooms based on determining whether or not a current position satisfies the position condition.

The method may include: transmitting configuration information including the chat room configuration for the one or more chat rooms to a server, to enable the server to provide the chat room configuration to another electronic device associated with the one or more chat rooms, and to cause the another electronic device to apply the chat room configuration.

The storing the chat room configuration may include: storing the chat room configuration including the deactivation condition of a first chat room among the one or more chat rooms, wherein the method may further include transmitting configuration information including the chat room configuration for the first chat room to a server, and wherein the chat room configuration may enable the server to inform a member of the first chat room that the first chat room of the messenger application is deactivated in the electronic device.

The deactivating the one or more chat rooms may include: hiding the one or more chat rooms from a chat room list of the messenger application.

When the one or more chat rooms are deactivated, a message associated with a first deactivation chat room of the one or more chat rooms may not be displayed as an unread message on the messenger application while the first deactivation chat room is deactivated.

The method may further include, when the one or more chat rooms are deactivated, displaying a message associated with a first deactivation chat room of the one or more chat rooms using a separate user interface.

When the one or more chat rooms are deactivated, a message associated with the one or more chat rooms is not received.

The method may further include providing suggested deactivation condition information based on a plurality of behavior pattern data stored in the electronic device.

According to another embodiment of the disclosure, an electronic device for deactivating a chat room of a messenger application, may include: an input and output device configured to receive a deactivation request for one or more chat rooms, in association with a chat room configuration that includes a deactivation condition for the one or more chat rooms; at least one memory storing instructions; and at least one processor configured to execute the instructions to: store the chat room configuration including the deactivation condition for the one or more chat rooms in the at least one memory based on the deactivation request; and deactivate the one or more chat rooms based on determining whether or not the deactivation condition for the one or more chat rooms is satisfied.

The input and output device is further configured to receive an activation request for at least one of the deactivated one or more chat rooms, and the at least one processor is further configured to execute the instructions to activate the at least one of the deactivated one or more chat rooms based on the activation request.

The input and output device may include a touch screen, and the at least one processor is further configured to execute the instructions to: control the touch screen to display a user interface for setting the deactivation condition of the chat room configuration; and control the touch screen to receive a user input through the user interface, for setting the deactivation condition of the chat room configuration.

The input and output device may include a touch screen, and the at least one processor is further configured to execute the instructions to: control the touch screen to display a user interface for setting the deactivation condition of the chat room configuration; control the touch screen to receive a user input through the user interface, in association with an activation condition for the one or more chat rooms; and determine the deactivation condition based on the activation condition.

The at least one processor may be further configured to execute the instructions to: when the deactivation condition includes a time condition, deactivate the one or more chat rooms based on determining that a current time satisfies the time condition.

The electronic device may further include a positioning sensor for determining a current position of the electronic device, wherein the deactivation condition may include a position condition, and the at least one processor may be further configured to execute the instructions to deactivate the one or more chat rooms based on determining whether or not the current position satisfies the position condition.

According to another embodiment of the disclosure, there is provided a non-transitory computer-readable recording medium for storing a program executable by the at least one processor to perform the method for deactivating the chat room of the messenger application.

BRIEF DESCRIPTION OF THE DRAWINGS

The above and/or other aspects will be more apparent by describing certain example embodiments, with reference to the accompanying drawings, in which:

FIGS. 4B and 4C are schematic diagrams of a method for deactivating a chat room according to some embodiments of the present disclosure;

DETAILED DESCRIPTION

Figure 1:
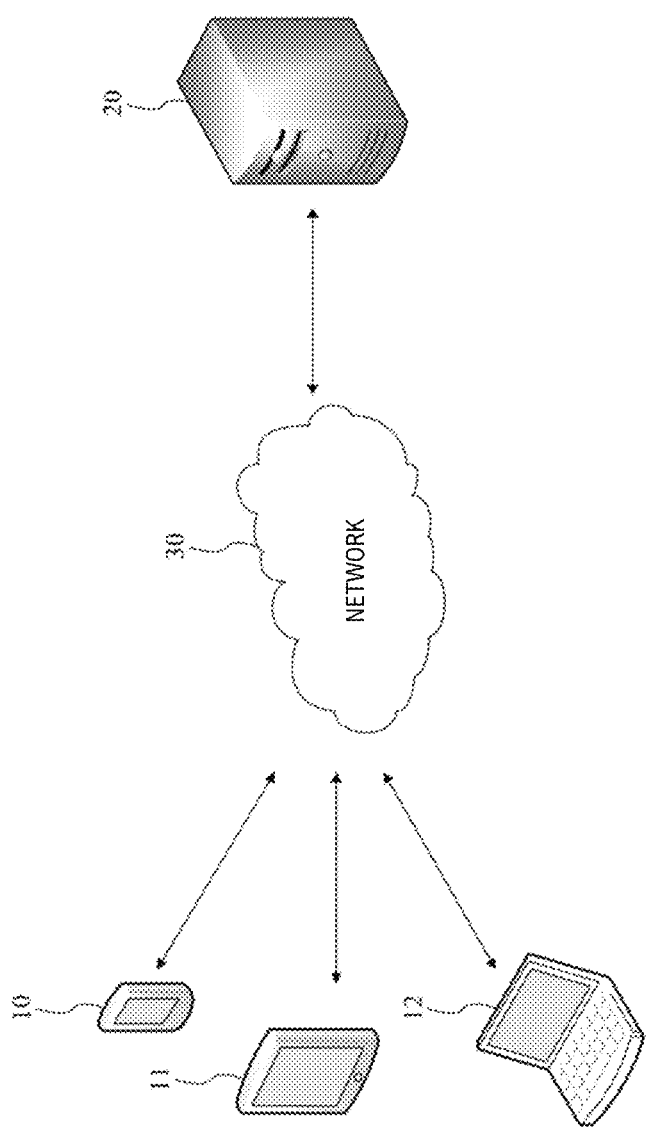
FIG. 1 is a schematic diagram of a network environment according to some embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

In the related art, with a messenger application installed on an electronic device, when a user operating the messenger application through the electronic device wants to proceed with a function configuration for a chatting interface, the user has to repeatedly input manual operations for different situations, and there is not enough flexibility of using functions and parameters configurable in the chatting interface. Accordingly, the present embodiment provides an electronic device, a method, and a computer-readable recording medium for deactivating a chat room of a messenger application based on a deactivation condition, and through configuration of the deactivation condition, the electronic device may automatically adjust the status of the chatting interface only in different situations.

FIG. 1 is a schematic diagram of a network environment according to some embodiments of the present disclosure. The network environment illustrated in FIG. 1 includes a plurality of electronic devices 10, 11, and 12, at least one server 20, and a network 30 connected to the electronic devices 10, 11, and 12 and the server 20. FIG. 1 is an example of a network environment of the present embodiment, and the number of electronic devices or the number of servers is not limited to those illustrated in FIG. 1.

The electronic devices 10, 11, and 12 may be fixed or mobile terminal devices implemented by a computer system. Specifically, the electronic devices 10, 11, and 12 may be smart phones, mobile phones, navigation devices, computers, notebook computers, tablet PCs, personal digital assistants (PDAs), and portable multimedia players (PMP), game consoles, wearable devices, Internet of Things (IoT) devices, virtual reality (VR) devices, augmented reality (AR) devices, and the like.

In some embodiments, as illustrated in FIG. 1, the electronic device 10 is a smartphone, for example. In some embodiments, the electronic device 10 may be one of various computer systems communicating with the other electronic devices 11 and 12 and/or the server 20 through a network 30 in a substantially wireless or wired communication manner.

In some embodiments, the network 30 may include at least one or more networks among networks such as personal area network (PAN), local area network (LAN), campus area network (CAN), metropolitan area network (MAN), wide area network (WAN), broadband network (BBN), the Internet, and the like.

In some embodiments, the network topology structure of the network 30 may include at least one of a bus type network, a star network, a ring network, a mesh type network, a star bus bar network, a tree type network, or a hierarchical network, which is not intended to limit the embodiment of the network 30. As it should be separately described, the communication method is also not limited, and in addition to communication using the network 30, communication between electronic devices may be performed using a short-range wireless communication method.

The server 20 may be implemented by at least one computer device (e.g., a network server), and may communicate with the electronic devices 10, 11, and 12 through the network 30, to provide services such as instructions, program codes, files, contents, and the like. For example, the server 20 may be a system that provides a network server, and may provide a network service to the electronic devices 10, 11, and 12 connected through the network 30. More specifically, an application (e.g., a messenger application with current communication function, and the like) correlated to the network service provided by the server 20 may be installed on the electronic devices 10, 11, and 12, such that, through the application executed on the electronic devices 10, 11, and 12, the server 20 may provide a network service (e.g., exchanging a current message between the electronic devices) to the electronic devices 10, 11, and 12.

Figure 2:
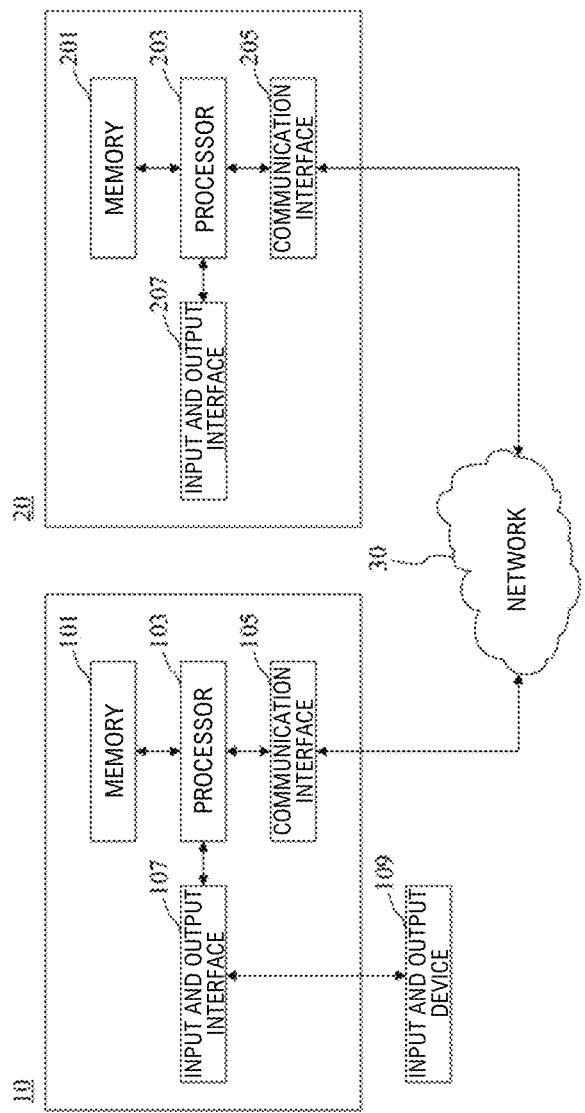
FIG. 2 is a block diagram of an electronic device and a server according to some embodiments of the present disclosure.

FIG. 2 is a block diagram of an internal structure of the electronic device and the server according to some embodiments of the present disclosure. It to be understood that, while FIG. 2 illustrates only the internal structures of the electronic device 10 and the server 20, the other electronic devices 11 and 12 may also have the same or similar internal structures as the electronic device 10.

In some embodiments, the electronic device 10 and the server 20 may include memories 101 and 201, processors 103 and 203, communication interfaces 105 and 205 and input and output interfaces 107 and 207, respectively. In some embodiments, the memories 101 and 201 may be a computer-readable recording medium, and may include a permanent mass storage device such as a random access memory (RAM), a read only memory (ROM), a floppy driver, a solid state drive (SSD), a flash memory, and the like.

In some embodiments, the permanent mass storage device such as ROM, SSD, flash memory, floppy driver, and the like, is different from the separate permanent storage device of the memories 101 and 201, and may be separately mounted on the electronic device 10 or the server 20. In some embodiments, the memories 101 and 201 may store an operating system (OS) and at least one program code (e.g., a program code for executing a browser installed on the electronic device 10 or a program code of an application installed on the electronic device 10 to perform a specific service, and the like).

In some embodiments, the software-associated elements described above may be loaded from a computer-readable recording medium independent of the memories 101 and 201. The computer-readable recording medium may include a computer-readable recording medium such as a diskette drive, a compact disk, a magnetic tape, a DVD/CD-ROM driver, a memory card, a USB device, and the like. In some embodiments, the software-associated elements may be received through the communication interface 105 and 205 and loaded into the memories 101 and 201. For example, the software-associated elements are provided to the electronic device 10 through the network 30 by a developer or a publishing system that issued the software, and after the electronic device 10 receives the software-related element using the communication interface 105, the elements are loaded and executed in cooperation with the memory 101 through the processor 103.

In some embodiments, the processors 103 and 203 process the instructions of the computer program through basic operations, logic, and input and output calculations. The instructions may be provided to the processors 103 and 203 from the memories 101 and 201 or through the communication interfaces 105 and 205. For example, the processors 103 and 203 may execute instructions of the program code of the recording device stored in the memories 101 and 201, and may execute the instructions of the program code received by the communication interfaces 105 and 205.

In some embodiments, the communication interfaces 105 and 205 may complete the function of the electronic device 10 and the server 20 communicating with each other through the network 30, and may also complete a function of the electronic device 10 and another electronic device (e.g., the electronic device 11) communicating with each other. For example, the processor 103 of the electronic device 10 may transmit a request, which is generated when the program code stored in the memory 101 is executed, to the server 20 through the network 30 using the communication interface 105.

Meanwhile, the processor 203 of the server 20 may execute a control signal, an instruction, a content, a file, or the like generated by the program code, and transmit it to the electronic device 10 through the network 30 using the communication interface 205. In some embodiments, the electronic device 10 may use the control signal, the instruction, the content, the file, or the like of the server 20 received by the communication interface 105, and transmit it to the processor 103 or the memory 101 for processing, and the content, the file, or the like may be stored in a storage medium (such as the permanent storage device described above) of the electronic device 10.

In some embodiments, the input and output interface 107 may be applicable to an interface unit connected to an input and output device 109. For example, the output device of the input and output device 109 may include a device such as a keyboard, a mouse, a microphone, a camera, and the like. The output device of the input and output device 109 may include a device such as a monitor, a speaker, a vibrator, a haptic feedback device, and the like.

In some embodiments, the input and output device 109 may be a touch screen having both of output and input functions, and the input and output interface 107 may be an interface unit between the touch screen and the electronic device 10, and in this case, the input and output device 109 may be configured as one device with the electronic device 10. Likewise, the input and output interface 207 of the server 20 may be an interface unit that connects the server 20 and an external input and output device, or an interface unit that is connected to an input and output device included in the server 20.

In some embodiments, in the process of processing the instructions of the computer program loaded into the memory 101, the processor 103 of the electronic device 10 may display a service screen or content including data provided by the server 20 or the electronic device 11 on the monitor via the input and output interface 107.

In some embodiments, the electronic device 10 and the server 20 may include more structural components than the structural components of FIG. 2, and most of the related art structural components will not be presented in detail herein. For example, the electronic device 10 may include at least one part of the input and output device 109 or other structural components such as a transceiver, a global positioning system (GPS) module, a camera lens, various sensors, a data library, and the like.

More specifically, when the electronic device 10 is a smartphone, the electronic device 10 may include a smartphone having various structural components such as an accelerometer, a gyro sensor, a camera lens module, various physical buttons, buttons using a touch panel, input and output terminals, a vibrator for vibrating, a speaker for making a sound, and the like.

In some embodiments, the processor 103 of the electronic device 10 may be regarded as the structural component or module, and these structural components or modules of the processor 103 may be regarded as different functions after executing the program code instructions stored in the memory 101 by the processor 103. In some embodiments, these structural components or modules of the processor 103 may optionally be included in the processor 103 or may be excluded from the processor 103. In some embodiments, these structural components or modules of the processor 103 may separate or combine all functions based on different circumstances.

In some embodiments, the electronic device 10 may include a current message management system implemented by a computer. For example, the current message management system mentioned above independently implements the messenger application, and the system is implemented as an in-app of a specific application and activated based on the specific application. In some embodiments, the electronic device 10 may provide a current message exchange service by interworking with the server 20.

According to embodiments of the disclosure, the user can use an electronic device, a method, and a computer-readable recording medium for deactivating a chat room of a messenger application based on a deactivation condition, and through configuration of the deactivation condition, the electronic device can automatically adjust the state of the chatting interface of the messenger application for different situations. It is to be understood that a graphical user interface (GUI) of the messenger application illustrated in the drawings described below is merely exemplary, and as long as it can be generally applicable to the operation interface of the messenger application linked to the network (e.g., the server 20) at the back end, it is not necessary to limit the scope of the present embodiment to the illustrated aspect. A specific embodiment of an electronic device and method for deactivating a chat room of a messenger application based on a deactivation condition will be described in detail below.

Figure 3:
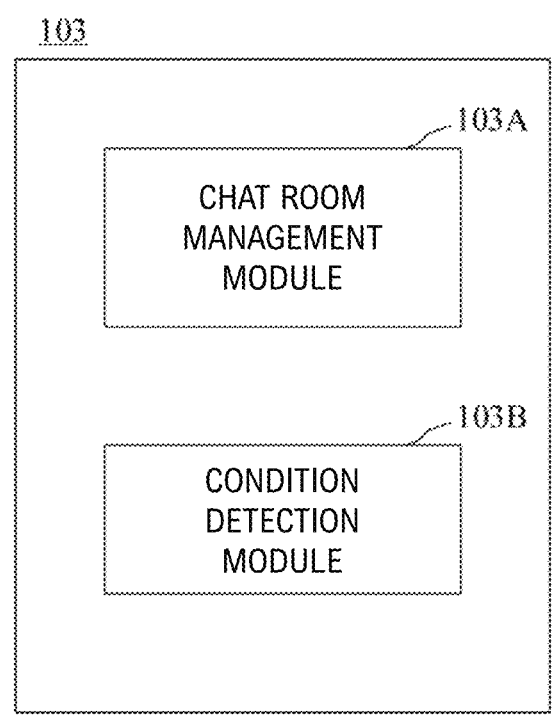
FIG. 3 is a block diagram of a component or module that a processor of an electronic device may include, according to some embodiments of the present disclosure.

FIG. 3 is a block diagram of a structural component or module included in a processor of an electronic device according to some embodiments of the present disclosure.

Specifically, as illustrated in FIG. 3, the processor 103 of the electronic device 10 may include at least a chat room management module 103A and a condition detection module 103B. The chat room management module 103A may execute the program code instructions stored in the memory 101 to perform a chat room management function, and the condition detection module 103B may execute the program code instructions stored in the memory 101 to perform a deactivation condition detection function.

Figure 4A:
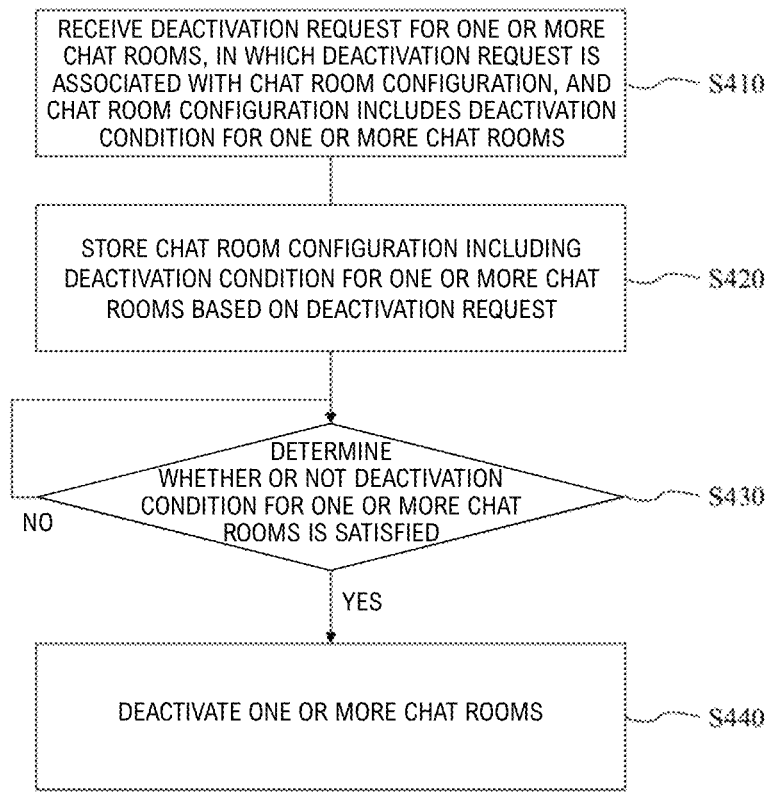
FIG. 4A is a flowchart illustrating a method executable by another electronic device, for deactivating a chat room according to some embodiments of the present disclosure.

FIG. 4A is a flowchart illustrating a method 400 executable by the electronic device, for deactivating a chat room of the messenger application based on the deactivation condition, according to some embodiments of the present disclosure. In some embodiments, the method illustrated in FIG. 4A may be performed by a message processing system implemented in the electronic device 10 based on an instruction provided by the messenger application installed on the electronic device 10. In other words, after the processor 103 executes the OS and related program code instructions stored in the memory 101, the chat room management module 103A and the condition detection module 103B may perform operations S410, S420, S430, and S440 of the method 400 illustrated in FIG. 4A.

When the method 400 starts, the processor 103 may read the corresponding program code instructions loaded into the memory 101 from the memory 101, and these program code instructions include program code instructions for causing the chat room management module 103A and the condition detection module 103B to execute operations S410, S420, S430, and S440.

In some embodiments, when the user executes the messenger application installed on the electronic device 10, the user may set a chat room of the messenger application. Specifically, when the user operates the messenger application through the electronic device 10, the user may input a deactivation request to the messenger application through the input and output device 109 to set a deactivation condition for one or more chat rooms of the messenger application, and in this case, the chat room management module 103A of the processor 103 may execute operation S410 and receive the deactivation request for one or more chat rooms through the input and output device 109.

In some embodiments, when the input and output device 109 is a touch screen, the chat room management module 103A of the processor 103 may display a first GUI on the touch screen to receive the deactivation request. In some embodiments, the first GUI may receive a deactivation request for a plurality of chat rooms, and through the operation of the first GUI, the deactivation request may be applied to the plurality of chat rooms. In some embodiments, the first GUI receives the deactivation request for a single chat room, and through operation on the first GUI, the deactivation request is applied to the single chat room.

In some embodiments, after the electronic device 10 receives the deactivation request through the touch screen, the chat room management module 103A of the processor 103 may display a second GUI on the touch screen to set the deactivation condition included in the chat room configuration. In some embodiments, the second GUI may provide a deactivation condition setting switch, and the user may enter a user input through the deactivation condition setting switch of the second GUI to directly set the deactivation condition. In some embodiments, the second GUI may provide an activation condition setting switch, and the user may enter a user input through the activation condition setting switch of the second GUI to set the activation condition, and the chat room management module 103A of the processor 103 may determine a corresponding deactivation condition for setting the chat room configuration based on the activation condition.

Then, the chat room management module 103A of the processor 103 may execute operation S420, and store the chat room configuration including the deactivation condition in the memory 101 based on the deactivation request and the corresponding input, and accordingly, in a subsequent process of executing the messenger application, the electronic device 10 may determine the state of the corresponding chat room according to the deactivation condition of the chat room configuration stored in the memory 101.

In some embodiments, the condition detection module 103B of the processor 103 is provided to perform operation S430 and periodically determine whether or not the deactivation condition of the chat room is satisfied, and if satisfied, the chat room management module 103A of the processor 103 may perform operation S440 to deactivate the corresponding chat room, and if not, the condition detection module 103B of the processor 103 may continuously and periodically determine whether or not the deactivation condition of the chat room is satisfied. In some embodiments, when the condition detection module 103B of the processor 103 determines that the deactivation condition of the chat room is not satisfied, the chat room management module 103A of the processor 103 may activate the chat room.

According to an embodiment, when it is determined that the deactivation condition of the chat room is satisfied, the processor 103 may not receive a message transmitted by another user from the server 20. Then, when it is determined that the deactivation condition of the chat room is not satisfied, the processor 103 may receive a message not previously received from the server 20 and output it through the messenger application to provide the message to the user. In another embodiment, when it is determined that the deactivation condition of the chat room is satisfied, the processor 103 may receive a message transmitted by another user from the server 20, but does not provide the message to the user by keeping the received message from being output through the messenger application. Then, when the deactivation condition of the chat room is not satisfied, the processor 103 may output a message through the message application, so that the user may be provided with the message.

In some embodiments, the deactivation condition may include a time condition, in which case, when the condition detection module 103B of the processor 103 determines that the current time of the electronic device 10 satisfies the time condition, the chat room management module 103A of the processor 103 deactivates the corresponding chat room. For example, when the deactivation condition includes a deactivation time zone of 18:00 to 09:00, the chat room management module 103A deactivates the corresponding chat room when the current time is between 18:00 and 09:00 (e.g., 18:01). When the condition detection module 103B of the processor 103 determines that the current time is out of the deactivation time zone of 18:00 to 09:00 (e.g., 09:01), the chat room management module 103A of the processor 103 activates the corresponding chat room.

In some embodiments, the deactivation condition includes a position condition, in which case, when the condition detection module 103B of the processor 103 determines that the current position of the electronic device 10 satisfies the position condition, the chat room management module 103A of the processor 103 deactivates the corresponding chat room. For example, the deactivation condition may include a distance range of 3 km or more from point A, in which case, when the condition detection module 103B of the processor 103 determines that the current position of the electronic device 10 is out of the distance range of 3 km or more from the point A, the chat room management module 103A of the processor 103 deactivates the corresponding chat room. When the condition detection module 103B of the processor 103 determines that the current position of the electronic device 10 is within the range of 3 km from the point A, the chat room management module 103A of the processor 103 activates the corresponding chat room.

In some embodiments, the current time of the electronic device 10 may be an operation time of the electronic device 10 itself, a time of a global positioning system (GPS) signal band, or a time detected in a network environment. In some embodiments, the current position of the electronic device 10 may be determined through a positioning device (e.g., a positioning sensor), and the positioning device may be a GPS device or a network positioning device (e.g., Wi-Fi positioning device, Bluetooth positioning device, and the like).

In some embodiments, deactivating a chat room in an embodiment may include hiding the chat room from a chat room list of the messenger application. In some embodiments, deactivating a chat room in an embodiment may include hiding messages associated with the chat room. In this case, the hidden messages may be displayed through a separate third GUI. In some embodiments, deactivating a chat room in an embodiment may include blocking messages associated with the chat room which are transmitted by the server, in which the blocked message may be buffered at the server, and the deactivated chat room may receive the messages again and display the same in the chat room after being activated.

In some embodiments, when the user wants to activate the deactivated chat room, the user may input an activation request to the messenger application through the input and output device 109. Specifically, when the input and output device 109 is a touch screen, the user may input an activation request through the first GUI, in which the chat room management module 103A of the processor 103 receives the activation request through the input and output device 109, and activates at least one of the deactivated one or more chat rooms based on the activation request.

Figure 4B:
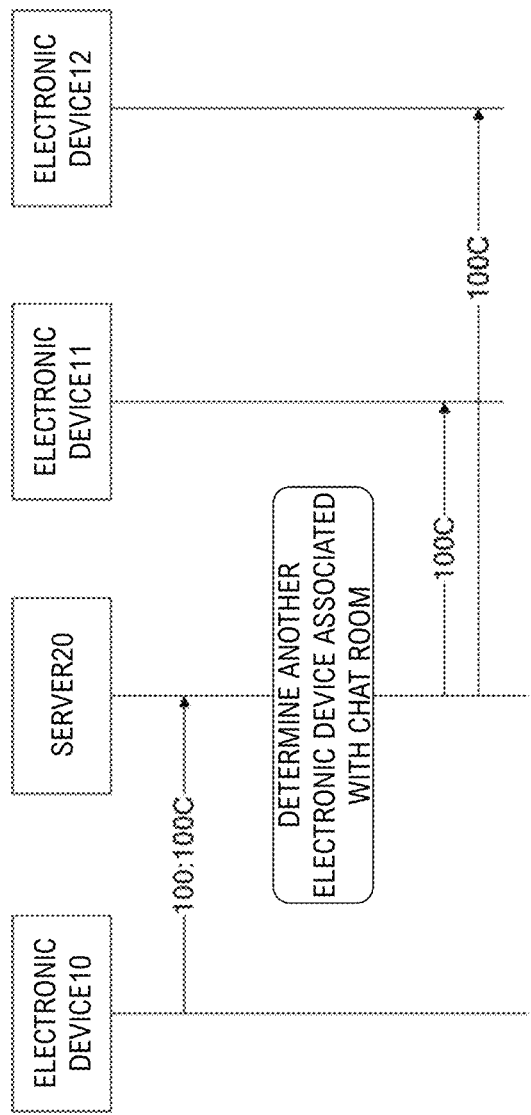

Reference is additionally made to FIG. 4B which is a schematic diagram of a chat room deactivation method according to some embodiments of the present disclosure. In some embodiments, when the user operating the electronic device 10 is a manager of the chat room, the electronic device 10 may notify the corresponding configuration settings to other users in the chat room through the network. Specifically, after the user operates the electronic device 10 and completes setting the chat room configuration of a specific chat room, the chat room management module 103A of the processor 103 may transmit configuration information 100 to the server 20 through the communication interface 105, and the configuration information 100 may include chat room configuration 100C of the specific chat room.

Then, after the server 20 receives the configuration information 100, the server 20 may first determine other members of the corresponding chat room based on the configuration information 100, and provide the chat room configuration 100C included in the configuration information 100 to the electronic devices (e.g., electronic devices 11 and 12) of the other members such that the electronic devices of the other members apply the chat room configuration 100C to the running messenger application. As a result, all members of the chat room can have the same chat room configuration.

Reference is additionally made to FIG. 4C which is a schematic diagram of a chat room deactivation method according to some embodiments of the present disclosure. In some embodiments, after setting the deactivated chat room, the electronic device 10 may notify the corresponding status of the other users in the chat room through the network. Specifically, after the user operates the electronic device 10 to deactivate a specific chat room, the chat room management module 103A of the processor 103 may transmit the configuration information 110 to the server 20 through communication interface 105, in which the configuration information 110 may include chat room configuration 110C for the specific chat room.

Then, after the server 20 receives the configuration information 110, the server 20 may first determine other members of the corresponding chat room based on the configuration information 110. After that, when determining that the deactivation condition of the chat room is satisfied based on the chat room configuration 110C, the server transmits a message 200 to the electronic devices of the other members (e.g., the electronic devices 11 and 12), so that the electronic devices of the other members know that the user of the electronic device 10 is going to deactivate the chat room. In some embodiments, the server 20 transmits the message 200 to the electronic devices of other members of the chat room, and the electronic devices of the other members display the message 200 in a specific position of the chat room (e.g., at the top of the chat room).

In some embodiments, the electronic device 10 may record a behavior pattern of the user activating the electronic device 10, and store a plurality of corresponding behavior pattern data in the memory 101. The chat room management module 103A of the processor 103 may provide suggested deactivation condition information to the user through a specific interface of the messenger application according to the plurality of behavior pattern data such that the user can select a deactivation condition.

For example, when the user normally misses a message in a specific chat room at a specific time, the electronic device 10 may record this behavioral pattern in the memory 101 in the form of data, learn through machine learning technology, and determine a behavioral pattern that "the user does not use the specific chat room at the specific time". Accordingly, according to the data of this behavior pattern, the chat room management module 103A of the processor 103 provides information suggesting that "the user does not use the specific chat room at the specific time" to the user through a specific interface of the messenger application, such that the user may set the deactivation condition with this suggested information.

Figure 5:
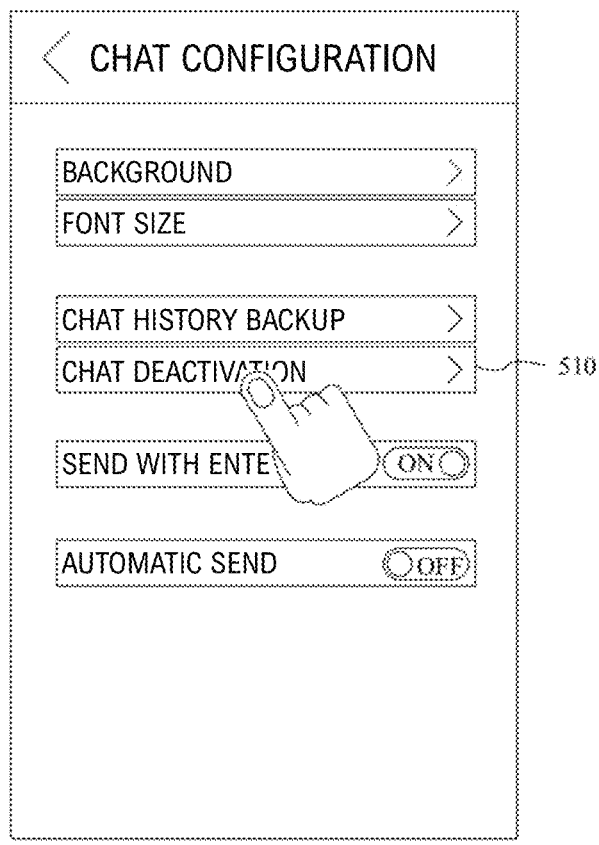
FIGS. 5 to 7 are schematic diagrams of a messenger application interface according to some embodiments of the present disclosure.
Figure 6:
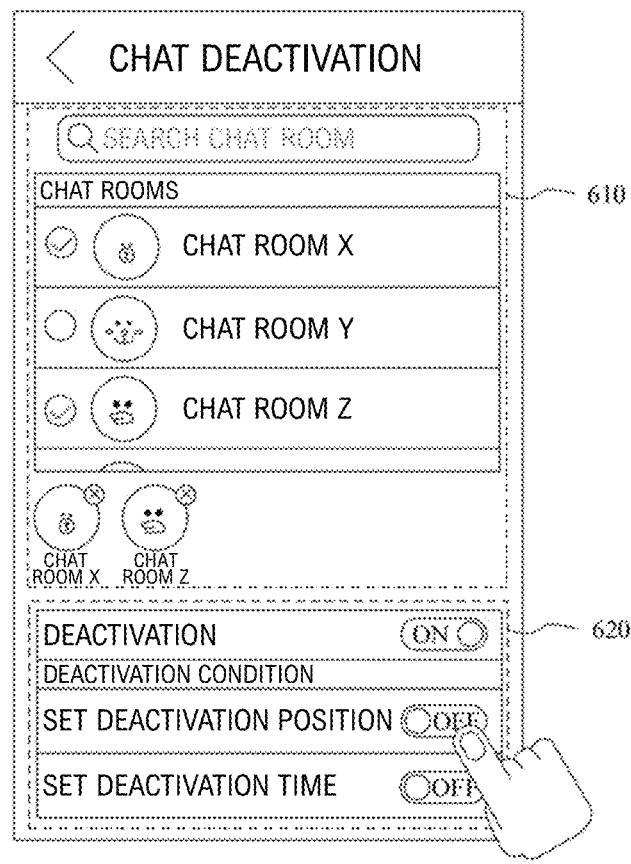

In some embodiments, the messenger application installed on the electronic device 10 may include a GUI for operating various configurations. FIGS. 5 and 6 are schematic diagrams of the GUI of the messenger application according to some embodiments of the present disclosure. Specifically, the GUI 500 of FIG. 5 is an interface for configuring general settings for chatting. In this case, the GUI 500 of the chat configuration interface may include a chat deactivation option 510. After the user clicks the chat deactivation option 510 by using the touch screen of the electronic device 10, that is, after the chat room management module 103A of the processor 103 of the electronic device 10 receives the deactivation request of the user through the touch screen, the chat room management module 103A may display a GUI 600 for setting chat deactivation as illustrated in FIG. 6 through the touch screen. In some embodiments, the deactivation request described above may include a touch signal generated by the user clicking on the chat deactivating option 510 through the touch screen.

In some embodiments, the deactivation request may be applicable to a plurality of chat rooms. In other words, as illustrated in FIG. 6, the GUI 600 is an interface for setting chat deactivation. In this example, the GUI 600 may include a chat room selection area 610 and a deactivation setting area 620, for setting a chat room configuration for the selected chat room. In detail, as illustrated in FIG. 6, the chat room selection area 610 is provided for the user to select a chat room to be deactivated, and the deactivation setting area 620 provides the user with an option to set a deactivation switch (e.g., to select whether or not to deactivate) and a deactivation condition.

For example, as illustrated in FIG. 6, the chat room selection area 610 may provide a function of searching chat rooms, thereby allowing the user to select a chat room to operate with a keyword search method. In addition, listed chat rooms, for example, chat rooms such as chat room X, chat room Y, chat room Z, and the like may be displayed in a upper portion, and when the user selects a chat room to be deactivated, a check mark is displayed to the left of the chat room, and the checked chat rooms are listed at a lower portion of the chat room selection area 610. When the user wants to uncheck the chat room, the user may do so by clicking once again the check mark in the left of the checked chat room, and as illustrated, the user can also uncheck the chat room by clicking "X" on an upper right corner of each chat room listed at the bottom of the chat room selection area 610.

Figure 7:
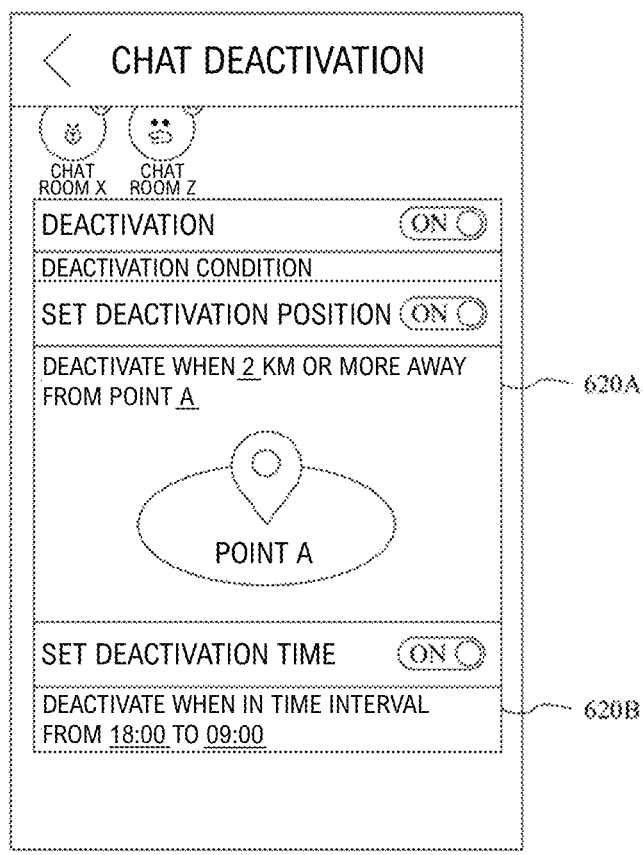

Then, the user may turn on the deactivation switch in the deactivation setting area 620 (that is, set the deactivation to an ON state), and display switches for setting the deactivation condition in the GUI 600. In the implemented example, when the chat room X and the chat room Z are selected and the deactivation switch is turned on, the deactivation condition may be applied to the chat rooms X and Z. More specifically, the switch for setting the deactivation condition may include a switch for setting a deactivation position and a switch for setting a deactivation time. Referring additionally to FIG. 7, when the user turns on the switch for setting a deactivation position, a deactivation position setting area 620A may be displayed. In particular, the deactivation position setting area 620A includes a point setting part and a distance setting part. The point setting part is provided for setting a specific point from which the distance is to be measured. The distance setting part is provided for setting a distance range from the specific point.

For example, the user may input the position of a specific point A (e.g., the office position where the user works or longitude position information) or a map resource connected to the network in the deactivation position setting area 620A of the GUI 600, and select the point A using the map resource. Then, the user may input a distance of 2 km in the deactivation position setting area 620A to complete setting the deactivation position. Accordingly, when it is determined that the electronic device 10 is out of a distance of 2 km from the point A, that is, when it is determined that the current position of the electronic device 10 is outside the range of 2 km of the point A, the chat room X and the chat room Z may be automatically deactivated (or continuously deactivated). In some embodiments, when it is determined that the electronic device 10 is at a distance of less than 2 km from point A, that is, when it is determined that the current position of the electronic device 10 is within a range of 2 km of point A, the chat room X and the chat room Z may be automatically activated (or continuously activated).

Meanwhile, when the user turns on the switch for setting a deactivation time, elements 610, 620, 620A and 620B of the GUI 600 are automatically rearranged and a deactivation time setting area 620B may be displayed. In this example, the deactivation time setting area 620B may include a time setting part for setting a specific time interval. For example, the user may input a time interval of 18:00 to 09:00, which corresponds to off-hours, in the deactivation time setting area 620B of the GUI 600 and complete setting the deactivation time. Accordingly, when the electronic device 10 determines that the current time is within the 18:00 to 09:00 time interval (e.g., 21:00), the chat room X and the chat room Z may be automatically deactivated (or continuously deactivated). In some embodiments, when the electronic device 10 determines that the current time is outside the time interval of 18:00 to 09:00 (e.g., 17:00), the chat room X and the chat room Z may be automatically activated (or continuously activated).

As another example, the switch for setting a deactivation condition may include a switch for setting a deactivation period. When the user turn on the switch for setting a deactivation period, a deactivation period setting area may be displayed. In this example, the deactivation period setting area may include a period setting part for setting a specific period (e.g., a start time and an end time of the period). For example, the user may input a period of January 1 to January 10, which is a vacation period, in the deactivation period setting area and complete setting the deactivation period. Accordingly, when the electronic device 10 determines that the current date is within the period of January 1 to January 10 (e.g., January 5), the chat room X and the chat room Z may be automatically deactivated (or continuously deactivated). In some embodiments, when the electronic device 10 determines that the current date is outside the period of January 1 to January 10 (e.g., January 11), the chat room X and the chat room Z may be automatically activated (or continuously activated).

In addition, a specific operation condition, a specific action condition, and a specific state condition for the electronic device 10 may be set as a deactivation condition. For example, the user may set an operation (or input) of pressing a volume button a predetermined number of times (that is, the specific operation condition) as the deactivation condition. In particular, when the operation (or input) of pressing the volume button of the electronic device 10 the predetermined number of times is recognized, the chat room may be automatically deactivated (or continuously deactivated). After that, when an operation (or input) of pressing the volume button of the electronic device 10 the predetermined number of times is recognized again, the chat room may be automatically activated (or continuously activated). As another example, the user may set an action of turning over the electronic device 10 (that is, the specific operation condition) as the deactivation condition. When the action of turning over the electronic device 10 is recognized by the sensor of the electronic device 10, the chat room may be automatically deactivated (or continuously deactivated). After that, when the action of turning over the electronic device 10 is recognized again, the chat room may be automatically activated (or continuously activated). As another example, the user may set a battery state of the electronic device 10 as the deactivation condition. When it is determined that the battery of the electronic device 10 is equal to or less than a predetermined percentage value, the chat room may be automatically deactivated (or continuously deactivated). After that, when it is determined that the battery of the electronic device 10 is equal to or greater than the predetermined percentage value, the chat room may be automatically activated (or continuously activated).

The electronic device 10 and/or the server 20 may be connected to another external system. For example, the electronic device 10 and/or the server 20 may be connected to a work management system of the user. In particular, the electronic device 10 and/or the server 20 may receive information such as place of work, working time, vacation schedule, and the like of the user from the corresponding work management system, and may automatically set the deactivation condition based on the received information.

In one embodiment, the deactivation condition set by the user for a specific chat room may also be applicable to at least some other users of the users included in the corresponding chat room. That is, when a user (for example, user A) corresponding to a manager (or moderator, operator, and the like) of the chat room X sets the deactivation condition for the chat room X, among the users included in the chat room X, the chat rooms of users (e.g., user B, user C) satisfying the deactivation condition may be automatically deactivated (or continuously deactivated). As an example, user A corresponding to the manager of the chat room X (e.g., "Taipei people's community") may set, as a deactivation position condition for the chat room X, a distance of at least 2 km away from a specific point. After that, when it is determined that the electronic device of the user B among users included in chat room X is 3 km away from the specific point, the chat room X of the user B may be automatically deactivated (or continuously deactivated). Then, when it is determined that the electronic device of the user B is less than 2 km away from the specific point, the chat room may be automatically activated (or continuously activated).

As another example, the user A corresponding to the manager of the chat room Y (e.g., "High school students' community") may set a time interval from 0 AM to 5 PM as a deactivation time condition for the chat room Y After that, when it is determined that the current time is within the time interval of 0 AM to 5 PM (e.g., 3 PM), the chat rooms of users (e.g., user A, user B, user C) included in the chat room Y may be automatically deactivated (or continuously deactivated). Then, when it is determined that the current time is outside the time interval between 0 and 5 PM (e.g., 5:01 PM), the chat room may be automatically activated (or continuously activated).

In some embodiments, the user may turn off the deactivation switch in the deactivation setting area 620, that is, the chat room management module 103A of the processing unit 103 of the electronic device 10 may receive an activation request by the user who activates the chat room through the touch screen, and then the chat room management module 103A may activate the deactivated chat room. In some embodiments, the activation request described above may include a touch signal by the user who turns off the deactivation switch in the deactivation setting area 620 through the touch screen.

Figure 8:
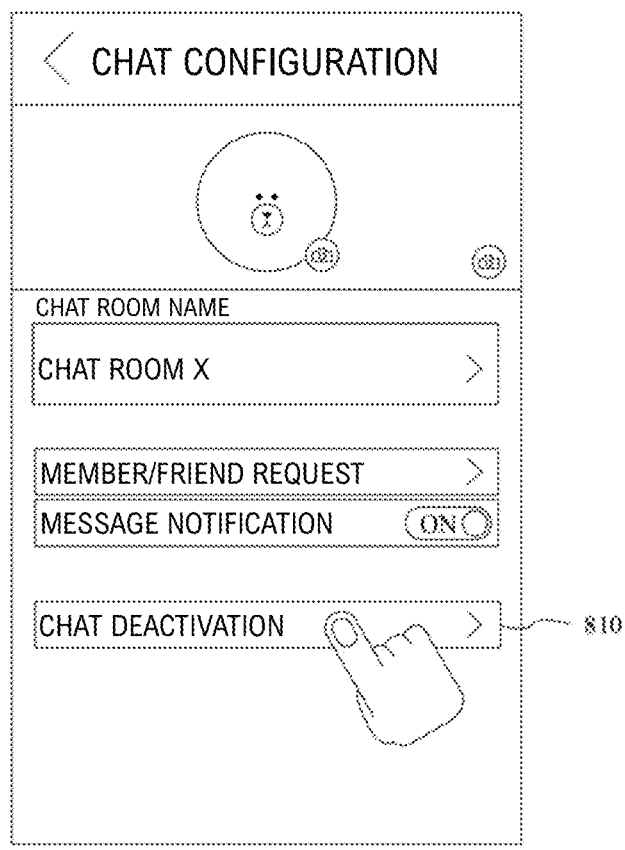
FIGS. 8 to 10 are schematic diagrams of a messenger application interface according to some embodiments of the present disclosure.
Figure 9:
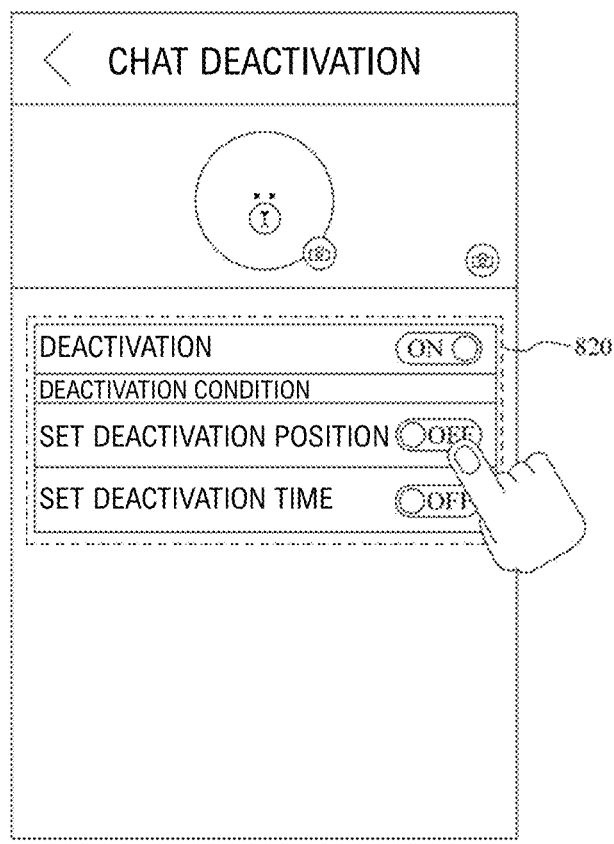

In some embodiments, the deactivation request may be applied to a single chat room, and FIGS. 8 and 9 are GUI schematic diagrams associated with this. Specifically, a GUI 800 of FIG. 8 is an interface for setting a single chat room (e.g., the chat room X as illustrated). In particular, the GUI 800 may include a chat deactivation option 810. After the user clicks the chat deactivation option 810 through the touch screen of the electronic device 10, that is, when the chat room management module 103A of the processor 103 of the electronic device 10 receives the deactivation request of the user through the touch screen, the chat room management module 103A may display a GUI 900 for setting chat deactivation illustrated in FIG. 9 through the touch screen. In some embodiments, the deactivation request described above may include a touch signal generated by the user clicking on the chat deactivating option 810 through the touch screen.

In some embodiments, as illustrated in FIG. 9, the GUI 900 may be an interface for setting chat deactivation, and may include a deactivation setting area 820 for setting the chat room configuration for the chat room X. In particular, the deactivation setting area 820 may provide the user with a deactivation switch and an option for setting a deactivation condition. For example, as illustrated in FIG. 9, for the chat room X, the user may turn on the deactivation switch in the deactivation setting area 820, and a switch for setting a deactivation condition may be displayed in the GUI 900. The switch for setting a deactivation condition may include a switch for setting a deactivation position and a switch for setting a deactivation time.

Figure 10:
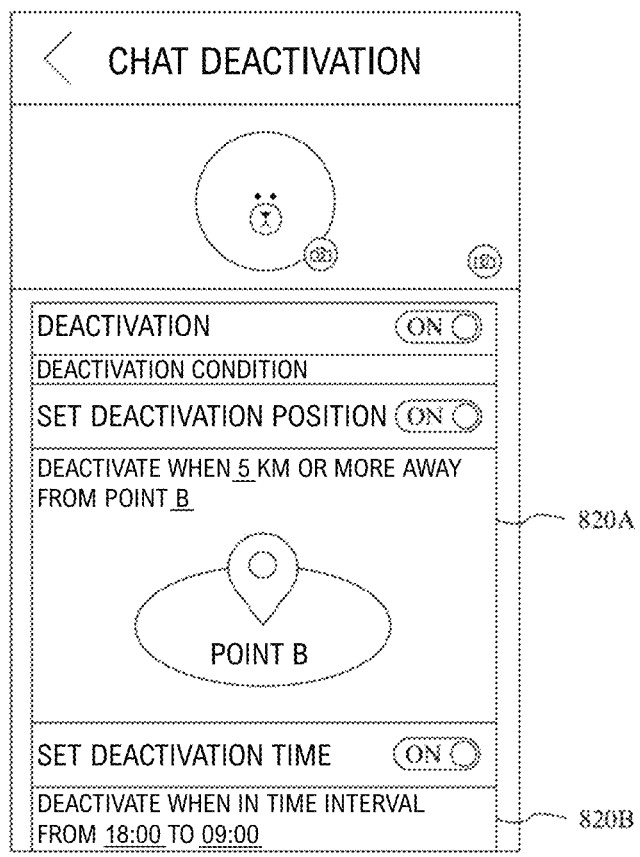

More specifically, referring additionally to FIG. 10, when the user turns on the switch for setting a deactivation position, a deactivation position setting area 820A may be displayed. In particular, the deactivation position setting area 820A may include a point setting part and a distance setting part, in which the point setting part is provided for setting a specific point, and the distance setting part is provided for setting a distance range from the specific point.

For example, the user may input the position of a specific point B and a map resource connected to the network in the deactivation position setting area 820A of the GUI 900, and select the point B by using the map resource. Then, the user may input a distance of 5 km in the deactivation position setting area 820A of the GUI 900 and complete setting the deactivation position. Accordingly, when it is determined that the distance between the electronic device 10 and the point B is greater than 5 km apart, that is, when it is determined that the current position of the electronic device 10 is outside the range of 5 km of the point B, the chat room X may be automatically deactivated (or continuously deactivated). In some embodiments, when it is determined that the distance between the electronic device 10 and point B is less than the distance of 5 km, that is, when it is determined that the current position of the electronic device 10 is within the range of 5 km of point B, the chat room X may be automatically activated (or continuously activated).

Meanwhile, when the user turns on the switch for setting a deactivation time, a deactivation time setting area 820B may be displayed. In this example, the deactivation time setting area 820B may include a time setting part for setting a specific time interval. For example, the user may input a time interval of 18:00 to 09:00, which corresponds to off-hours, in the deactivation time setting area 820B of the GUI 900 and complete setting the deactivation time. Accordingly, when the electronic device 10 determines that the current time is within the time interval of 18:00 to 09:00 (e.g., 18:00), the chat room X may be automatically deactivated (or continuously deactivated). In some embodiments, when the electronic device 10 determines that the current time is outside the time interval of 18:00 to 09:00 (e.g., 9:00 AM), the chat room X may be automatically activated (or continuously activated).

In some embodiments, the user may turn off the deactivation switch in the deactivation setting area 820, that is, when the chat room management module 103A of the processor 103 of the electronic device 10 receives an activation request by the user who activates the chat room through the touch screen, then the chat room management module 103A activates the deactivated chat room. In some embodiments, the activation request described above may include a touch signal by the user who turns off the deactivation switch in the deactivation setting area 820 through the touch screen.

Figure 11:
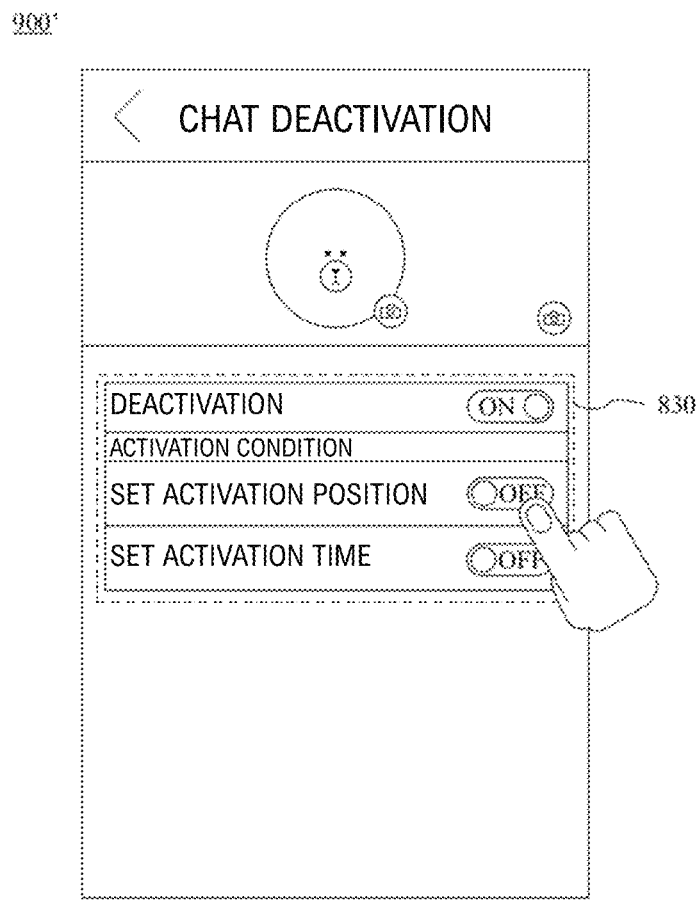
FIGS. 11 and 12 are schematic diagrams of a messenger application interface according to some embodiments of the present disclosure.

In some embodiments, as illustrated in FIG. 11, the GUI 900' may be an interface for setting chat deactivation, and may include a deactivation setting area 830 for setting the chat room configuration for the chat room X. In an example, the deactivation setting area 830 may provide the user with the deactivation switch and an option for setting the activation condition. For example, as illustrated in FIG. 11, for the chat room X, when the user turns on the deactivation switch in the deactivation setting area 830, a switch for setting an activation condition may be displayed in the GUI 900'. In particular, the switch for activation condition configuration may include a switch for setting an activation position and a switch for setting an activation time.

Figure 12:
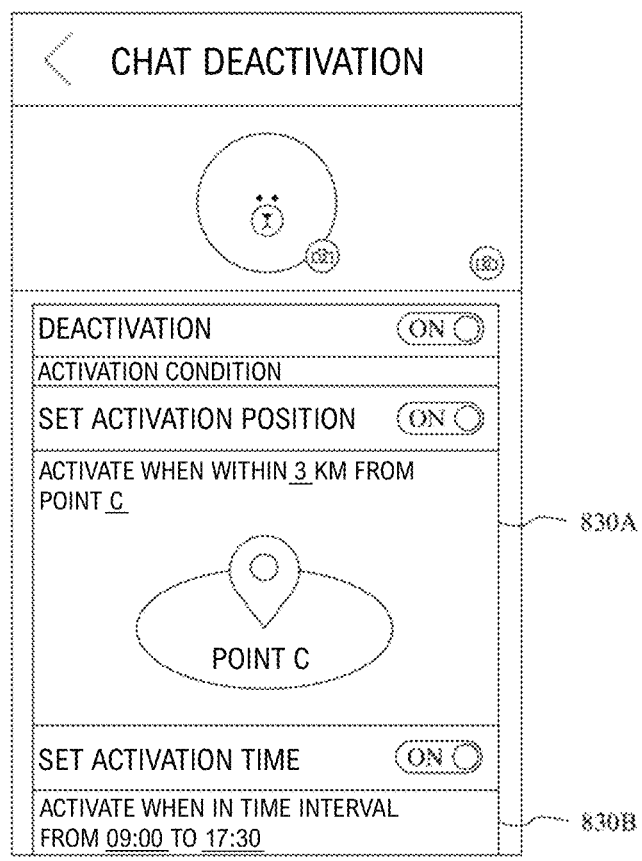

More specifically, referring additionally to FIG. 12, when the user turns on the switch for setting an activation position, an activation position setting area 830A may be displayed. In particular, the activation position setting area 830A includes a point setting part and a distance setting part, in which the point setting part is provided for setting a specific point, and the distance setting part is provided for setting a distance range from the specific point.

For example, the user may input the position of a specific point C and a map resource connected to the network in the deactivation position setting area 830A of the GUI 900', and select the point C by using the map resource. Then, the user may input a distance of 5 km in the activation position setting area 830A of the GUI 900' and complete setting the deactivation position. Accordingly, when it is determined that the distance between the electronic device 10 and the point C is equal to or less than a distance of 3 km, that is, when it is determined that the current position of the electronic device 10 is within a range of 3 km of the point C, the chat room X may be automatically activated (or continuously activated). In some embodiments, when it is determined that the distance between the electronic device 10 and point C is equal to or greater than the distance of 3 km, that is, when it is determined that the current position of the electronic device 10 is outside the range of 3 km from point C, the chat room X may be automatically deactivated (or continuously deactivated).

Meanwhile, when the user turns on the switch for setting an activation time, an activation time setting area 830B may be displayed. In this example, the activation time setting area 830B may include a time setting part for setting a specific time interval. For example, the user may input a time interval of 9:00 to 17:30, which corresponds to working hours, in the activation time setting area 830B of the GUI 900' and complete setting the activation time. Accordingly, when the electronic device 10 determines that the current time is within the time interval of 09:00 to 17:30 (e.g., 10:00), the chat room X may be automatically activated (or continuously activated). In some embodiments, when the electronic device 10 determines that the current time is outside the time interval of 9:00 to 17:30 (e.g., 18:00), the chat room X may be automatically deactivated (or continuously deactivated).

Figure 13:
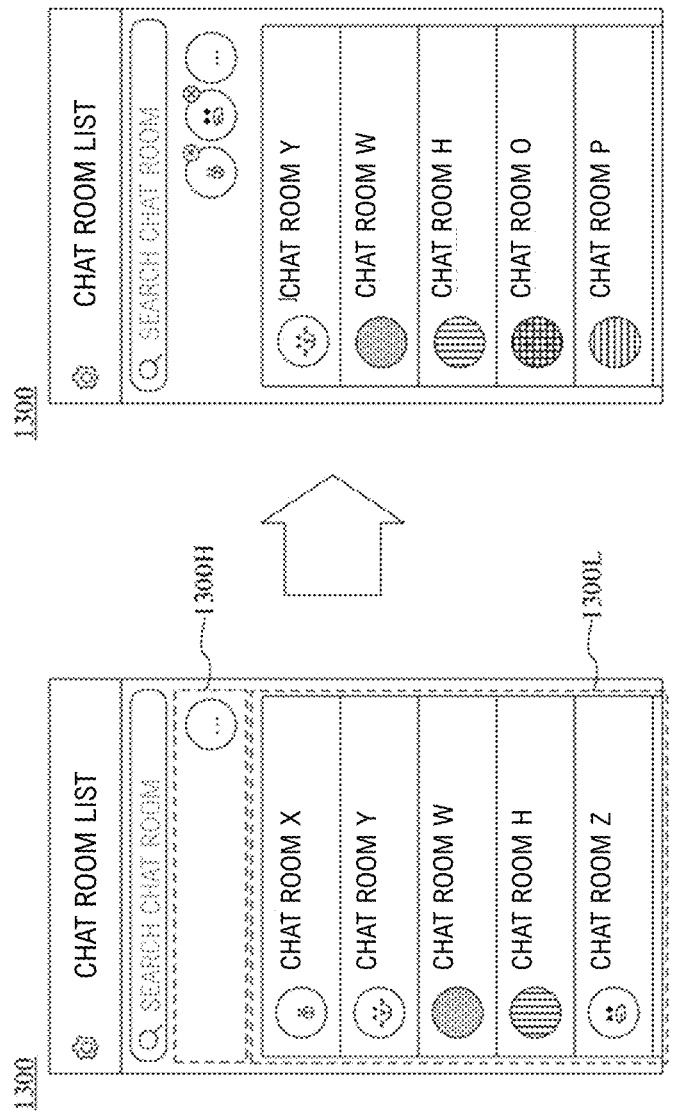
FIGS. 13 to 15 are schematic diagrams of operations on a messenger application interface according to some embodiments of the present disclosure.

In some embodiments, automatically deactivating a chat room may include hiding the chat room from the chat room list of the messenger application. Reference is additionally made to FIG. 13 which is a schematic diagram of a GUI of a messenger application according to some embodiments of the present disclosure. Specifically, a GUI 1300 of FIG. 13 includes an interface of a chat room list 1300L for displaying the messenger application, and the GUI 1300 may also include an interface for displaying a deactivation chat room list 1300H.

More specifically, when the condition detection module 103B of the processor 103 determines that the deactivation condition is satisfied, the chat room management module 103A may hide the corresponding chat room. As illustrated in FIG. 13, when the chat room to be deactivated is the chat room X and the chat room Z, the chat room X and the chat room Z may be hidden from the chat room list 1300L. That is, the chat room list 1300L may not display the chat room X and the chat room Z. In some embodiments, the chat rooms X and chat rooms Z, which are hidden due to deactivation, may be displayed in the deactivation chat room list 1300H. Additionally, information on the deactivation condition of each of the chat rooms hidden due to deactivation in the deactivation chat room list 1300H may be displayed together. For example, information on the deactivation position condition and/or the deactivation time condition and the like may be displayed together.

Figure 14:
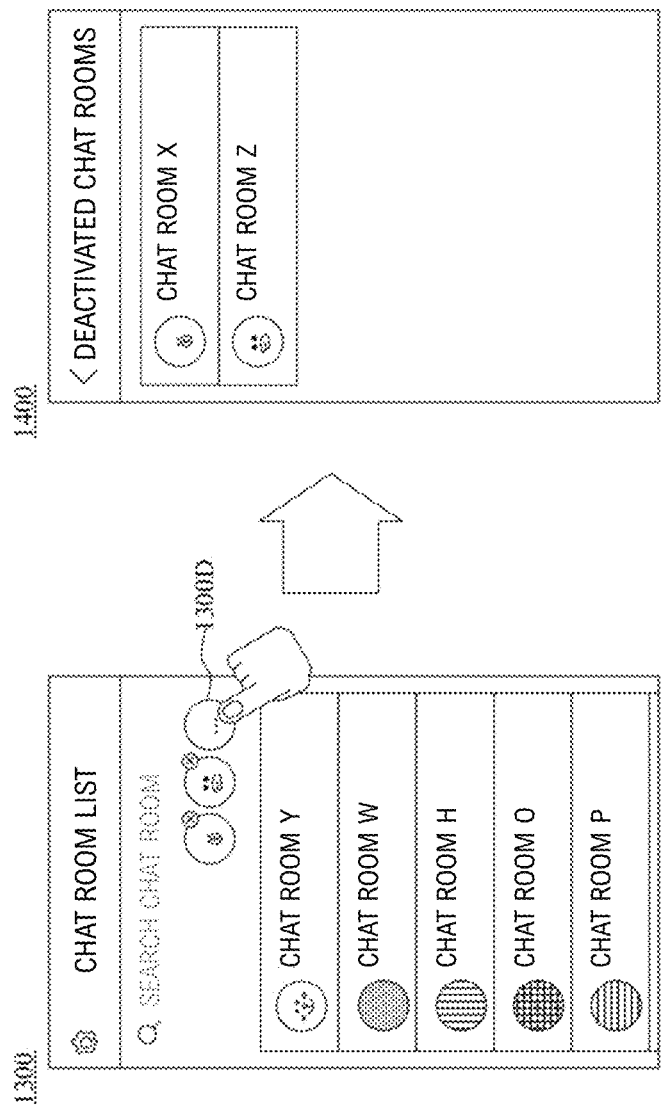

Referring additionally to FIG. 14, in some embodiments, the GUI 1300 includes a display button 1300D, and when the user clicks the display button 1300D through the touch screen of the electronic device 10, that is, when the chat room management module 103A of the processor 103 of the electronic device 10 receives a touch operation for the display button 1300D of the user through the touch screen, the chat room management module 103A may display a GUI 1400 illustrated in FIG. 14 through the touch screen. Specifically, the GUI 1400 may include the hidden chat rooms X and Z, thus allowing the user to check the currently hidden chat rooms through the operation of the display button 1300D and the GUI 1400.

Figure 15:
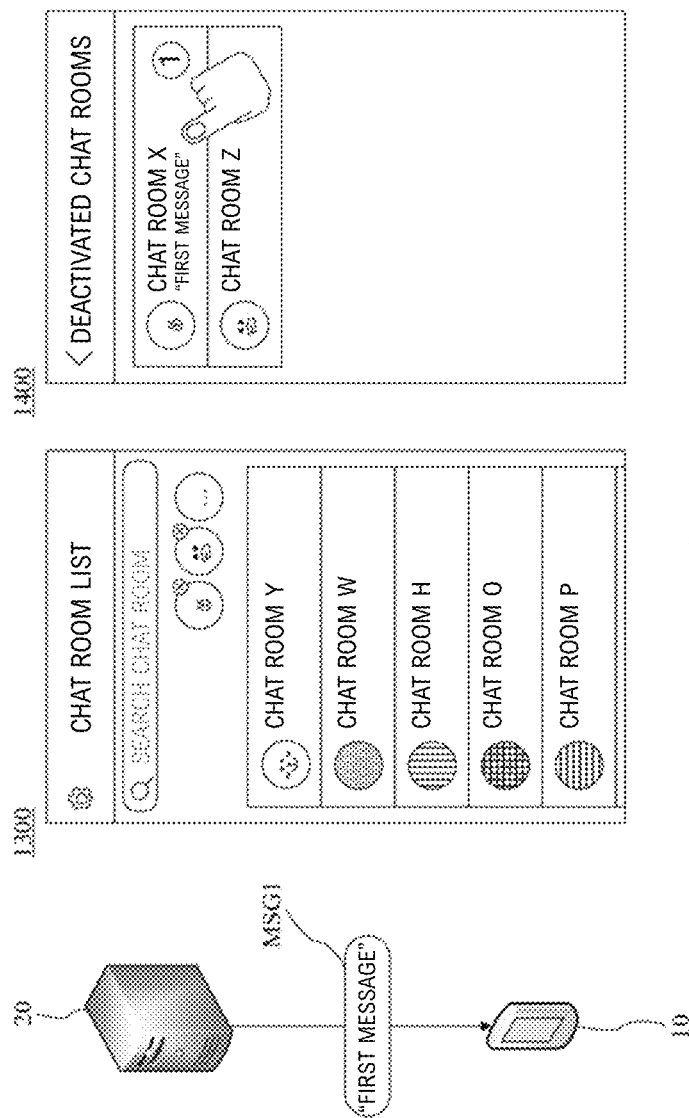

In some embodiments, when a message corresponding to a deactivated chat room is transmitted to the electronic device, the message may be hidden. Referring to FIG. 15, when a first message MSG1 is transmitted from the server 20 to the electronic device 10, the chat room management module 103A of the processor 103 may first determine the chat room that corresponds to the first message MSG1. When the first message MSG1 corresponds to the deactivated chat room X, the first message MSG1 may not be displayed in the GUI 1300, and the first message MSG1 may be hidden in the GUI 1300. In some embodiments, the first message MSG1 may be displayed at the position of the corresponding chat room X through the GUI 1400. The chat room X displayed on the GUI 1400 may display the number of unread messages.

Figure 16:
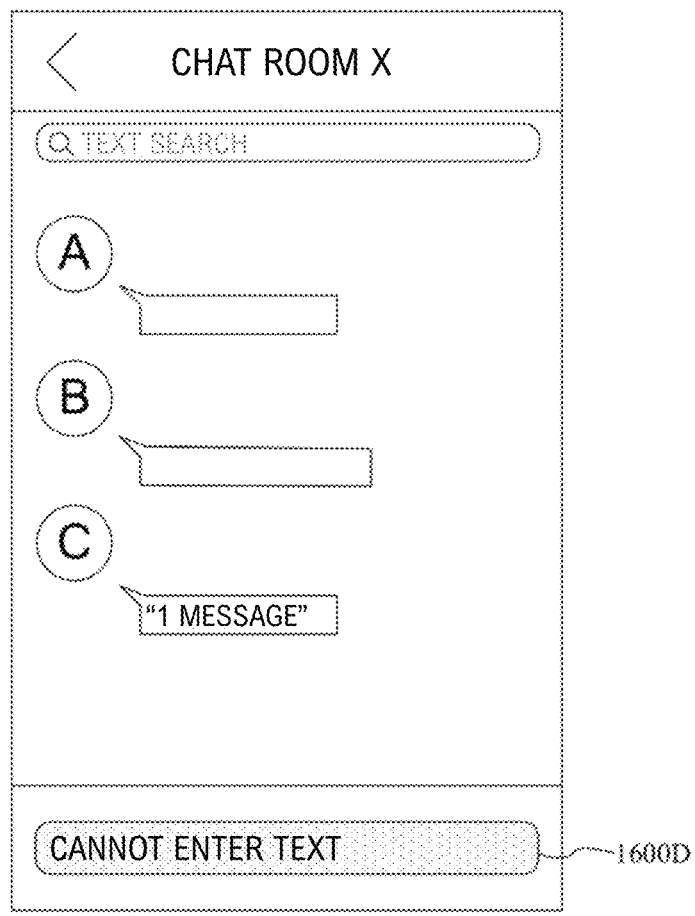
FIG. 16 is a schematic diagram of a messenger application interface according to some embodiments of the present disclosure.

In some embodiments, the user may click on the hidden chat room X to check the messages. Specifically, when the user clicks the chat room X of the display button GUI 1400 through the touch screen of the electronic device 10, the chat room management module 103A may display a GUI 1600 illustrated in FIG. 16 through the touch screen. In particular, the GUI 1600 may include the message content of the chat room X. In some embodiments, the GUI 1600 may include a conversation input area 1600D for transmitting a message to the chat room. In some embodiments, when the chat room X is deactivated, the function of the conversation input area 1600D is turned off, that is, the user may not be able to input text in the conversation input area 1600D. According to an example, even when the user checks the message received in the deactivated chat room X, it may not be read and be left as an unread message.

Figure 17:
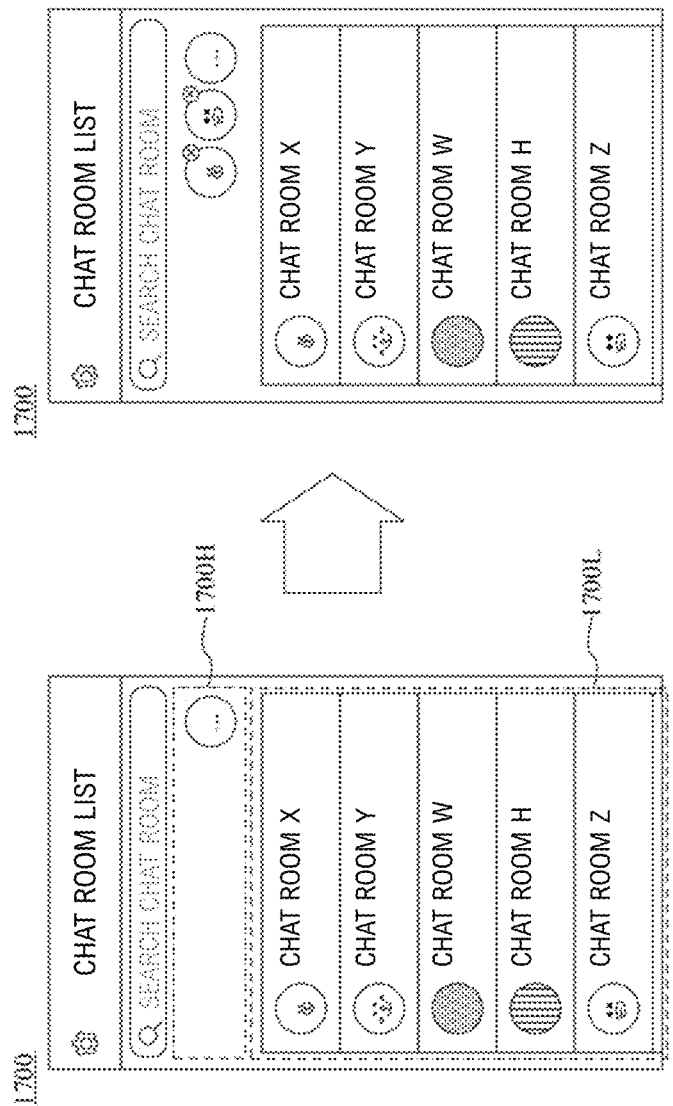
FIGS. 17 and 18 are schematic diagrams of operations on a messenger application interface according to some embodiments of the present disclosure.

In some embodiments, automatically deactivating a chat room may include hiding a message associated with the deactivated chat room. Reference is additionally made to FIG. 17 which is a schematic diagram of a GUI of a messenger application according to some embodiments of the present disclosure. Specifically, a GUI 1700 of FIG. 17 may include an interface for displaying a chat room list 1700L of the messenger application, and the GUI 1700 may also include an interface for displaying a deactivation chat room list 1700H.

Figure 18:
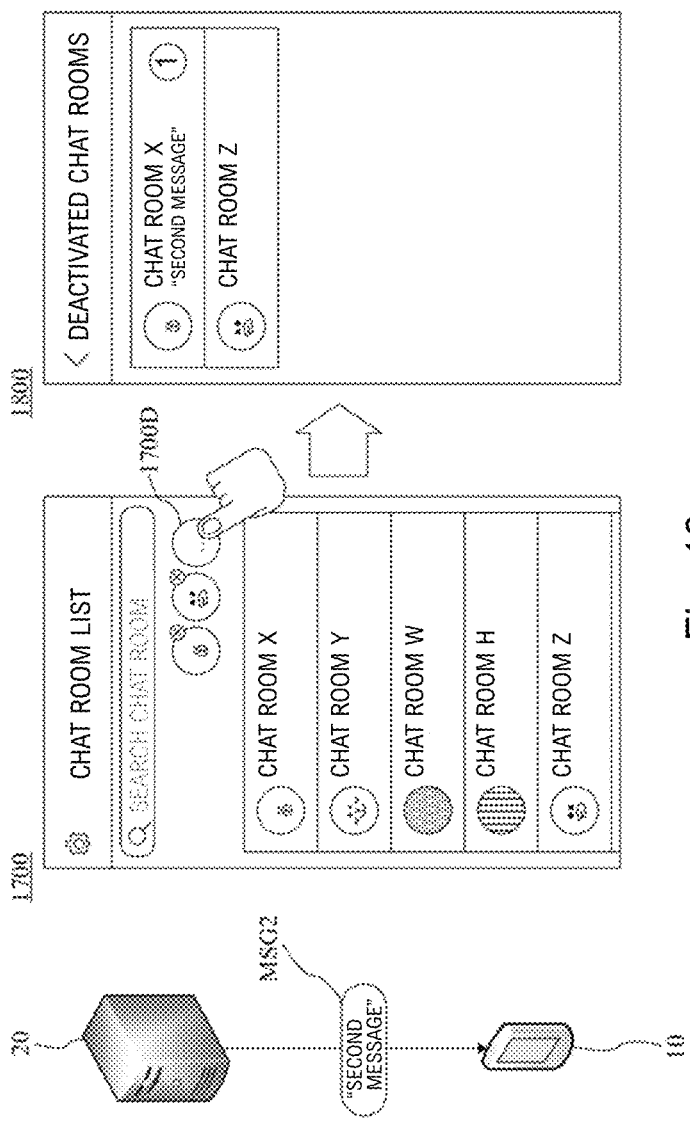

Specifically, when the condition detection module 103B of the processor 103 determines that the deactivation condition is satisfied, the chat room management module 103A may display the deactivated chat room in the deactivation chat room list 1700H, and proceed with message monitoring for the deactivated chat room. Referring additionally to FIG. 18, in some embodiments, when a second message MSG2 is transmitted from the server 20 to the electronic device 10, the chat room management module 103A of the processor 103 may first determine the chat room that corresponds to the second message MSG2. When the second message MSG2 corresponds to the deactivated chat room X, the second message MSG2 may not be displayed in the chat room X of the GUI 1700, or in other words, the second message MSG2 may be hidden in the GUI 1700.

In some embodiments, the GUI 1700 includes a display button 1700D, and when the user clicks the display button 1700D through the touch screen of the electronic device 10, that is, when the chat room management module 103A of the processor 103 of the electronic device 10 receives a touch operation for the display button 1700D by the user through the touch screen, the chat room management module 103A may display a GUI 1800 illustrated in FIG. 18 through the touch screen. Specifically, the GUI 1800 may include the hidden chat rooms X and Z, and the second message MSG2 may be displayed at a position of the corresponding chat room X through the GUI 1800. The chat room X displayed on the GUI 1800 may display the number of unread messages.

In some embodiments, after setting the deactivated chat room, the electronic device 10 may notify the corresponding status of the other users in the chat room through the network. Specifically, when the user operates the electronic device 10 to deactivate the chat room X, the chat room management module 103A of the processor 103 may transmit the configuration information to the server 20 through the communication interface 105. The configuration information may include a chat room configuration associated with the chat room X.

Then, after the server 20 receives the configuration information, the server 20 may first determine the other members of the corresponding chat room X based on the configuration information. After that, when determining that the deactivation condition of the chat room X is satisfied based on the chat room configuration, the server transmits a message to the electronic devices of the other members (e.g., the electronic devices 11 and 12), so that the electronic devices of the other members know that the user of the electronic device 10 is going to deactivate the chat room X.

Figure 19:
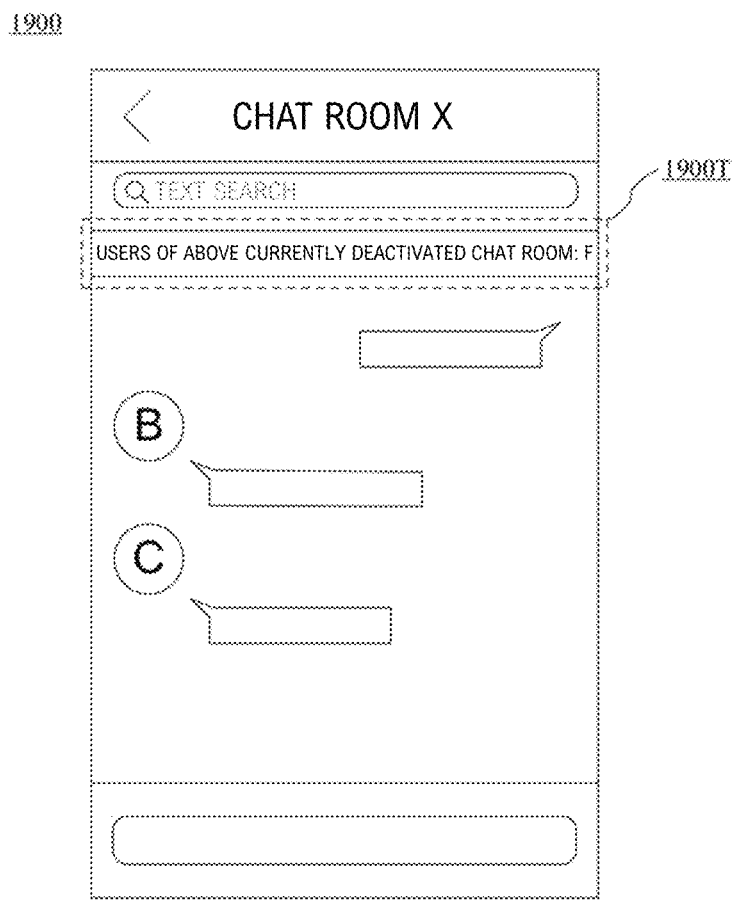
FIG. 19 is a schematic diagram of a messenger application interface according to some embodiments of the present disclosure.

For example, reference is made to FIG. 19, which is a schematic diagram of a GUI of a messenger application according to some embodiments of the present disclosure. In other words, another member (e.g., user A) of the chat room X may execute a GUI 1900 of FIG. 19 by using the electronic device and activate the interface of the messenger application. The GUI 1900 may include a notification area 1900T for displaying information on a member (e.g., user F)

who deactivated the current chat room X according to a message transmitted by the server 20. In particular, information on the deactivation condition of the member who deactivated the chat room X may be displayed in more detail on the interface of the messenger application of another member (e.g., user A). For example, the deactivation time condition and/or the deactivation position condition of the member who deactivated chat room X may be further displayed.

As described above, according to the embodiments of the present disclosure, when the user executes the messenger application with the electronic device and operates the associated interface, the user may set to deactivate different chat rooms through different preset deactivation conditions. Accordingly, when the deactivation condition is satisfied, the electronic device automatically deactivates or activates the chat room, thereby greatly improving the convenience of the user who executes and operates the messenger application by using the electronic device.

The device described above may be implemented through a hardware component, a software component, and/or a combination of the hardware and software components. For example, the devices and structural components described in the embodiments, such as a processor, a controller, an arithmetic logic unit (ALU), a digital signal processor, a microcomputer, a field programmable gate array (FPGA), a programmable logic unit (PLU), a microprocessor, or any device that executes and responds to instructions, may be implemented by using one or more general purpose computers or special purpose computers. A processing device may execute an OS and one or more applications executed on the OS. Further, the processing device accesses, stores, operates, processes, and generates data in response to the execution of software. For convenience of understanding, an example in which one processing device is used is described, and as will be readily appreciated by those skilled in the art, the processing device may include a plurality of processing elements and/or different types of processing elements. For example, the processing device may include a plurality of processors or one processor and one controller. In addition, other processing configurations such as a parallel processor may be further included.

The software may include a computer program, program code, instructions, or a combination of one or more thereof, and may configure the processing unit in a manner that works on demand or may transmit instructions to the processing unit in an independent or collective manner. Software and/or material may be embodied in any type of machine, structural component, physical device, or computer storage medium, for the interpretation by the processing device or for providing instructions or data to the processing device. The software may be stored or executed over a computer system connected through a network, in a distributed manner. The software and data may be stored on one or more computer-readable recording media.

The method of the embodiments may be implemented in the form of program instructions executed by various computer units and recorded in a computer-readable medium. In this case, the medium executes or downloads a persistently stored or temporarily stored computer executable program. In addition, the medium may be a variety of recording units or storage units in the form of combining one or a plurality of hardware, and is not limited to a medium directly connected to any computer system, and may be distributed in a network. Examples of the medium may include a magnetic medium such as a hard disk, a floppy disk, a magnetic tape, and the like, and stores program instructions in an optical recording medium such as a CD-ROM or DVD, and the like, a magnetic optical medium such as a floppy disk, and the like, and a ROM, RAM, flash memory, and the like, for example. In addition, another example of the medium may include an app store that distributes applications or a web page that supplies or distributes other various software, a recording medium or a storage medium managed through a server, and the like.

As described above, the embodiments have been described with limited embodiments and drawings, and those skilled in the art can easily devise various corrections and modifications from the above description. For example, the described technology may be performed in a different order than the method described herein, and/or structural components such as systems, structures, devices, circuits, and the like described herein may be coupled or combined in a different manner than the method described herein, or may be substituted with other structural components or equivalent technical solutions or substituted with feasible and suitable results.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for deactivating a chat room of a messenger application by an electronic device, the method comprising:
   receiving a deactivation request for one or more chat rooms, in association with a first chat room configuration that includes a deactivation condition for the one or more chat rooms;
   storing the first chat room configuration;
   deactivating the one or more chat rooms based on determining whether or not the deactivation condition for the one or more chat rooms is satisfied; and
   based on receiving a user input in a switch interface area for setting the deactivation condition, transmitting the first chat room configuration to a server, to enable the server to provide a second chat room configuration to another electronic device of another user associated with at least some of the one or more chat rooms, and to cause the another electronic device to apply the second chat room configuration,
   wherein a chat room associated with the second chat room configuration is included in the one or more chat rooms associated with the first chat room configuration, and
   wherein when a message is received that corresponds to the one or more chat rooms that are deactivated, the message is hidden and an indicator is displayed on a user interface indicating that the message has been received for the corresponding one or more chat rooms that are deactivated, and based on receiving another user input on the user interface corresponding to the indicator, the message that is hidden is displayed with a conversation input area that indicates the user is not permitted to enter text.

2. The method according to claim 1, further comprising:
   receiving an activation request for at least one of the deactivated one or more chat rooms; and
   activating the at least one of the deactivated one or more chat rooms based on the activation request.

3. The method according to claim 1, further comprising:
   displaying the user interface for setting the deactivation condition included in the first chat room configuration.

4. The method according to claim 1, further comprising:
displaying the user interface for setting the deactivation condition included in the first chat room configuration;
receiving, via the user interface, the user input associated with an activation condition for the one or more chat rooms; and
determining the deactivation condition based on the activation condition.

5. The method according to claim 1, wherein the deactivation condition includes a time condition, and
the deactivating the one or more chat rooms includes deactivating the one or more chat rooms based on determining whether or not a current time satisfies the time condition.

6. The method according to claim 1, wherein the deactivation condition includes a position condition, and
the deactivating the one or more chat rooms includes deactivating the one or more chat rooms based on determining whether or not a current position satisfies the position condition.

7. The method according to claim 1, wherein the storing the first chat room configuration further comprises:
storing a third chat room configuration that includes the deactivation condition of a first chat room among the one or more chat rooms,
transmitting the third chat room configuration to a server,
wherein the third chat room configuration enables the server to inform a member of the first chat room that the first chat room is deactivated in the electronic device of the member, and
wherein the first chat room is one of the one or more chat rooms associated with the first chat room configuration.

8. The method according to claim 1, wherein the deactivating the one or more chat rooms includes: hiding the one or more chat rooms from a chat room list of the messenger application.

9. The method according to claim 1, wherein, when the one or more chat rooms are deactivated, a second message associated with a first deactivation chat room of the one or more chat rooms is not displayed as an unread message on the messenger application while the first deactivation chat room is deactivated.

10. The method according to claim 1, wherein, when the one or more chat rooms are deactivated, a second message associated with the one or more chat rooms is not received.

11. The method according to claim 1, further comprising providing suggested deactivation condition information based on a plurality of behavior pattern data stored in the electronic device.

12. An electronic device for deactivating a chat room of a messenger application, the electronic device comprising:
an input and output device configured to receive a deactivation request for one or more chat rooms, in association with a first chat room configuration that includes a deactivation condition for the one or more chat rooms;
at least one memory storing instructions; and
at least one processor configured to execute the instructions to:
store the first chat room configuration;
deactivate the one or more chat rooms based on determining whether or not the deactivation condition for the one or more chat rooms is satisfied; and
based on receiving a user input in a switch interface area for setting the deactivation condition, transmit the first chat room configuration to a server, to enable the server to provide a second chat room configuration to another electronic device of another user associated with at least some of the one or more chat rooms, and to cause the another electronic device to apply the second chat room configuration, and
wherein a chat room associated with the second chat room configuration is included in the one or more chat rooms associated with the first chat room configuration, and
wherein when a message is received that corresponds to the one or more chat rooms that are deactivated, the message is hidden and an indicator is displayed on a user interface indicating that the message has been received for the corresponding one or more chat rooms that are deactivated, and based on receiving another user input on the user interface corresponding to the indicator, the message that is hidden is displayed with a conversation input area that indicates the user is not permitted to enter text.

13. The electronic device according to claim 12, wherein the input and output device is further configured to receive an activation request for at least one of the deactivated one or more chat rooms, and
the at least one processor is further configured to execute the instructions to activate the at least one of the deactivated one or more chat rooms based on the activation request.

14. The electronic device according to claim 12, wherein the input and output device includes a touch screen, and
the at least one processor is further configured to execute the instructions to:
control the touch screen to display the user interface for setting the deactivation condition of the first chat room configuration.

15. The electronic device according to claim 12, wherein the input and output device includes a touch screen, and
the at least one processor is further configured to execute the instructions to:
control the touch screen to display the user interface for setting the deactivation condition of the first chat room configuration;
control the touch screen to receive the user input through the user interface, in association with an activation condition for the one or more chat rooms; and
determine the deactivation condition based on the activation condition.

16. The electronic device according to claim 12, wherein the at least one processor is further configured to execute the instructions to:
when the deactivation condition includes a time condition, deactivate the one or more chat rooms based on determining that a current time satisfies the time condition.

17. The electronic device according to claim 12, further comprising a positioning sensor configured to determine a current position of the electronic device, wherein
the deactivation condition includes a position condition, and
the at least one processor is further configured to execute the instructions to deactivate the one or more chat rooms based on determining whether or not the current position satisfies the position condition.

18. A non-transitory computer-readable recording medium for storing a program executable by at least one processor to perform a method for deactivating a chat room of a messenger application, the method comprising:

receiving a deactivation request for one or more chat rooms, in association with a first chat room configuration that includes a deactivation condition for the one or more chat rooms;

storing the first chat room configuration;

deactivating the one or more chat rooms based on determining whether or not the deactivation condition for the one or more chat rooms is satisfied; and based on receiving a user input in a switch interface area for setting the deactivation condition, transmitting the first chat room configuration to a server, to enable the server to provide a second chat room configuration to another electronic device of another user associated with at least some of the one or more chat rooms, and to cause the another electronic device to apply the second chat room configuration, and wherein a chat room associated with the second chat room configuration is included in the one or more chat rooms associated with the first chat room configuration, and wherein when a message is received that corresponds to the one or more chat rooms that are deactivated, the message is hidden and an indicator is displayed on a user interface indicating that the message has been received for the corresponding one or more chat rooms that are deactivated, and based on receiving another user input on the user interface corresponding to the indicator, the message that is hidden is displayed with a conversation input area that indicates the user is not permitted to enter text.

\* \* \* \* \*